United States Patent
Chaput et al.

(10) Patent No.: US 12,459,306 B2
(45) Date of Patent: Nov. 4, 2025

(54) TIRE COMPRISING A SIDEWALL INSERT

(71) Applicant: COMPAGNIE GENERALE DES ETABLISSEMENTS MICHELIN, Clermont-Ferrand (FR)

(72) Inventors: Vincent-Jacques Chaput, Clermont-Ferrand (FR); Bruno Guimard, Clermont-Ferrand (FR); Olivier Muhlhoff, Clermont-Ferrand (FR); Florian Vilcot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 90 days.

(21) Appl. No.: 18/029,764

(22) PCT Filed: Sep. 28, 2021

(86) PCT No.: PCT/FR2021/051676
§ 371 (c)(1),
(2) Date: Mar. 31, 2023

(87) PCT Pub. No.: WO2022/069832
PCT Pub. Date: Apr. 7, 2022

(65) Prior Publication Data
US 2025/0083477 A1 Mar. 13, 2025

(30) Foreign Application Priority Data
Oct. 1, 2020 (FR) .................................. FR2010024

(51) Int. Cl.
*B60C 13/00* (2006.01)
*B60C 13/02* (2006.01)
*B60C 13/04* (2006.01)

(52) U.S. Cl.
CPC .............. *B60C 13/00* (2013.01); *B60C 13/02* (2013.01); *B60C 13/04* (2013.01);
(Continued)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS 3,128,815 A  4/1964 Nonnamaker
3,638,704 A  2/1972 Boileau
(Continued)

FOREIGN PATENT DOCUMENTS

CN  1980803  6/2007
CN  104066598  9/2014
(Continued)

OTHER PUBLICATIONS

Written Opinion of International Patent Application No. PCT/FR2021/051675, dated Jul. 4, 2022.
(Continued)

*Primary Examiner* — Kendra Ly
(74) *Attorney, Agent, or Firm* — COZEN O'CONNOR

(57) ABSTRACT

A tire (1) having at least one sidewall (3), intended to interact with a sidewall insert (9) by way of an anchor (6), and aims to personalize the design of the sidewall. The anchor (6), has a recess (7) formed in an axially outer sidewall layer (30), with a protuberance (8), which is raised in relation to the recess bottom (71) and extends from the recess bottom (71) to the vicinity of the axially outer sidewall face (31), and the protuberance (8) is constituted by a stepped arrangement of a first narrow portion (81) having a minimum width Lpmin and a second wide portion (82) having a maximum width Lpmax, such that the difference
(Continued)

Lpmax−Lpmin is at least equal to 1 mm and at most equal to 4 mm.

25 Claims, 4 Drawing Sheets

(52) U.S. Cl.
CPC .. *B60C 2013/006* (2013.01); *B60C 2013/007* (2013.01); *B60C 2200/04* (2013.01)

(56) References Cited

U.S. PATENT DOCUMENTS

| | | | |
|---|---|---|---|
| 5,505,242 | A | 4/1996 | Narahara |
| 2008/0257471 | A1 | 10/2008 | Cottin et al. |
| 2009/0229727 | A1* | 9/2009 | Losey .................. B60C 15/024 |
| | | | 152/523 |
| 2010/0170608 | A1* | 7/2010 | Attinello ............... B60C 13/001 |
| | | | 152/523 |
| 2014/0360645 | A1 | 12/2014 | Sakamoto et al. |
| 2015/0075693 | A1 | 3/2015 | Dorfi |
| 2017/0225522 | A1 | 8/2017 | Tomita et al. |
| 2018/0141384 | A1* | 5/2018 | Habicht ................ B60C 9/0292 |

FOREIGN PATENT DOCUMENTS

| | | |
|---|---|---|
| EP | 2 692 542 | 2/2014 |
| JP | H08282218 | 10/1996 |
| JP | H 11 151918 | 6/1999 |
| JP | 2004082816 | 3/2004 |
| JP | 2013028284 | 2/2013 |
| JP | 2013063676 | 4/2013 |

OTHER PUBLICATIONS

International Search Report of International Patent Application No. PCT/FR2021/051675, dated Jul. 4, 2022.
Office Action of U.S. Appl. No. 18/029,740, dated Jun. 21, 2024.
Final Office Action of U.S. Appl. No. 18/029,740, dated Dec. 30, 2024.
Office Action of U.S. Appl. No. 18/029,740, dated Mar. 17, 2025.

* cited by examiner

TIRE COMPRISING A SIDEWALL INSERT

RELATED APPLICATIONS

This is a U.S. National Phase Application under 35 USC 371 of International Application PCT/FR2021/051676 filed on Sep. 28, 2021.

This application claims the priority of French application no. FR 2010024 filed Oct. 1, 2020, the entire content of all of which is hereby incorporated by reference.

FIELD OF THE INVENTION

The present invention relates to a tire, intended more particularly to equip a lightweight four-wheeled vehicle (motor vehicle, van) or two-wheeled vehicle (motorcycle), and comprising at least one sidewall with a sidewall insert, intended to personalize the design of the tire sidewall.

BACKGROUND OF THE INVENTION

An ongoing concern of vehicle manufacturers and users is to personalize the design of tire sidewalls using coloured means and/or additional elements, referred to as inserts in the present document.

A known coloured means is a coloured rubber composition, for example white in colour, which is present in the sidewall of the tire and contrasts with the black colour of the adjacent rubber compositions. However, this technical solution has a certain number of drawbacks. First of all, certain chemical components, such as protective components, that are present in the rubber compositions adjacent to the coloured means can migrate towards the coloured rubber composition and lead to it gradually losing colour over time. In addition, deformations of the sidewall throughout the service life of the tire can cause cracking to start in the coloured rubber composition and its appearance to deteriorate. Furthermore, the mechanical means used to mount the tire on its rim can also cause the coloured rubber composition to deteriorate by rubbing against it. Lastly, the manufacture of a tire comprising portions of differing colours is more complex in industrial terms.

Among the known inserts, document EP 2692542B1 describes a decorative ring intended to be mounted between the bead of the tire and the rim. However, the mounting of this ring is tricky because of its positioning. In addition, the presence of a ring between a bead of the tire and the rim can modify the mechanical behaviour of the tire, and thus that of the vehicle. Lastly, to install it correctly, this ring runs the risk of requiring adaptation of the geometry of the rim, which would then no longer conform to the standard of the rim profile for which the tire has been designed.

Document U.S. Pat. No. 3,128,815 describes another insert in the form of a tire lining element intended to be engaged removably in a sidewall. This lining element may be fixed to the sidewall by various means, such as engagement of its ends in the sidewall, attachment at its ends by anchoring means that are raised or recessed in relation to the sidewall. Moreover, the lining element described covers a significant portion of the sidewall, typically at least one third of the surface area of the sidewall, and is positioned more particularly in the radially inner segment of the sidewall, between the axially outermost point of the sidewall and the rim flange. However, this lining element is liable to deform and become detached from the sidewall when the tire is running, because it is positioned in a zone of high deflection of the tire.

Document JPH11151918 also describes a removable colour insert intended to be fixed to a tire sidewall, in the radially outer segment of the sidewall, close to the tread, by virtue of an attachment means that is recessed in relation to the surface of the sidewall. However, such an attachment means does not make it possible to easily mount this insert on the tire when the tire is mounted on its rim and inflated, because the geometry of the insert there may be insufficient compared with the geometry of the recess of the attachment means, depending on the inflation pressure or depending on the width of the rim. In addition, when the tire is running, the locking of the insert in the sidewall can be modified, for example under strong transverse accelerations, with a risk of the insert being ejected.

SUMMARY OF THE INVENTION

The inventors set themselves the objective of proposing a tire that is able to be equipped with at least one sidewall insert, with improved mounting on and attachment to the sidewall.

This objective has been achieved by a tire for a lightweight vehicle, which tire is intended to be mounted on a rim and is able to be equipped with at least one sidewall insert, the said tire having a nominal section of height H and comprising:
- two sidewalls that connect a crown respectively to two beads, each of which is intended to come into contact with the rim,
- at least one sidewall comprising an anchoring means intended to interact with at least one sidewall insert,
- the anchoring means extending at least partially circumferentially, in a circumferential direction of the tire, and comprising a recess formed in an axially outer sidewall layer comprising at least one rubber material and extending from an axially outer sidewall face axially towards the inside of the sidewall,
- the recess being delimited axially towards the inside by a recess bottom and radially by two recess walls,
- the recess having, in any meridian plane containing the axis of rotation of the tire, a depth Pc, the maximum distance measured perpendicularly between the axially outer sidewall face and the recess bottom, which is at least equal to 2 mm, and a width Lc measured, at the axially outer sidewall face, between the two recess walls which is at most equal to 15% of the nominal section height H of the tire,
- the anchoring means comprising a protuberance, which is raised in relation to the recess bottom and extends from the recess bottom to the vicinity of the axially outer sidewall face,
- and the protuberance being constituted, in any meridian plane, by a stepped arrangement of a first narrow portion, extending axially towards the outside from the recess bottom and having a minimum width equal to a minimum protuberance width Lpmin, and a second wide portion, extending axially towards the outside from the first narrow portion and having a maximum width equal to a maximum protuberance width Lpmax, such that the difference Lpmax−Lpmin is at least equal to 1 mm and at most equal to 4 mm.

The principle of the invention is to have an anchoring means, for a sidewall insert, which comprises a circumferential recess, formed in an axially outer sidewall layer, and a protuberance, formed in said recess.

The recess may be circumferentially continuous or circumferentially discontinuous, that is to say formed of separate circumferential portions.

The axially outer sidewall layer in which the recess is formed extends axially from an axially outer sidewall face, which is in contact with atmospheric air, to an axially outermost reinforcing layer, which is formed of reinforcers that are most often textile. More specifically, the axially outer sidewall layer is in axially inner contact with the rubber compound coating the reinforcers of the axially outermost reinforcing layer, usually referred to as coating compound.

The recess makes it possible to anchor the sidewall, by locking the edges of the sidewall insert between its walls. It thus contributes to holding the sidewall insert in place when the tire is running, said sidewall insert being liable to be ejected.

The recess also makes it possible to engage the sidewall insert in the thickness of the sidewall, so as to not create a significant protuberance in relation to the axially outer sidewall face, and therefore to not disrupt the flow of air in the vicinity of the sidewall in this zone. Consequently, the aerodynamic drag of the tire is not increased. Correspondingly, the rolling resistance of the tire, and therefore the fuel consumption, are also not increased.

According to an embodiment of the invention, the depth Pc of the recess is at least equal to 2 mm.

If the depth Pc is less than 2 mm, the anchoring means does not ensure sufficient attachment of the sidewall insert that makes it possible to withstand the various mechanical stresses applied to the tire in the course of its use, throughout its service life.

Also according to the invention, the width Lc of the recess is at most equal to 15% of the nominal section height H of the tire.

The width Lc of the recess must remain limited, because the more it increases, the more the deflection of the zone of the sidewall insert increases during use, this generating significant deformations and possible problems of fatigue of the sidewall insert. The deformations at the recess increase specifically with the width Lc of the recess, it being possible to express the width as a percentage of the nominal section height H of the tire or as an absolute value. The nominal section height H is defined by the usual standards relating to tires, such as, for example, the "European Tire and Rim Technical Organisation" or "ETRTO" standard.

The protuberance, formed in the recess from the recess bottom, is intended to come into contact with an axially inner face of the sidewall insert, and makes it possible to anchor the sidewall insert by virtue of its specific shape. The protuberance is thus constituted, in any meridian plane, by a stepped arrangement of a first narrow portion, extending axially towards the outside from the recess bottom and having a minimum width equal to the minimum protuberance width Lpmin, and a second wide portion, extending axially towards the outside from the first narrow portion and having a maximum width equal to the maximum protuberance width Lpmax. Such a protuberance thus has substantially the shape of a mushroom, the stem of which is the first narrow portion and the cap of which is the second wide portion. This protuberance configuration makes it possible to effectively clip the sidewall insert over the protuberance and ensures it is held in position when the tire is running, under mechanical bending and centrifugal stresses applied to the tire.

Advantageously, the depth Pc of the recess is at most equal to 3 mm.

More advantageously, the depth Pc of the recess is at most equal to 7 mm, and preferably at most equal to 5 mm.

If the depth Pc is greater than 7 mm, the thickness of the layer of rubber material, axially on the inside of the recess bottom, is not enough to ensure mechanical decoupling between the sidewall insert, which is intended to be engaged in the said recess, and the axially outermost reinforcing layer. This results in stress concentrations in the recess bottom that are liable to generate cracking and a reduction in the endurance of the sidewall. Furthermore, as regards manufacture, a recess of limited depth ensures the presence of a thickness of the layer of rubber material, axially on the inside of the recess bottom, despite the existence of significant movements of the materials present in this zone, during the steps for fabricating and then finishing the tire. In other words, a recess depth which is not too high makes it possible to ensure manufacturing tolerances.

With the axially outer sidewall layer having a width W at the anchoring means, the difference between the thickness W of the axially outer sidewall layer and the depth Pc of the recess is at least equal to 1 mm, preferably at least equal to 2 mm.

The thickness W is measured between the axially outer sidewall face and the axially outer fibres of the reinforcers of the axially outermost reinforcing layer: this thickness therefore takes into account the actual axially outer sidewall layer and the axially outer coating layer of the axially outermost reinforcing layer. The difference between the thickness W of the axially outer sidewall layer and the depth Pc of the recess thus defines the thickness of the layer of rubber material, comprised between the recess bottom and the axially outermost reinforcing layer.

A thickness of 1 mm is the minimum thickness of the layer of rubber material that ensures mechanical decoupling between the sidewall insert, which is intended to be engaged in the said recess, and the axially inner reinforcement of reinforcers at the interface with the axially outer sidewall layer. This minimum thickness consequently avoids stress concentrations in the recess bottom that are liable to generate cracking and a reduction in the endurance of the sidewall.

Advantageously, the width Lc of the recess is at most equal to 10% of the nominal section height H of the tire.

Likewise advantageously, the width Lc of the recess is at most equal to 20 mm, and preferably at most equal to 12 mm.

Preferably, the recess is formed in an axially outer sidewall layer made of a single rubber material.

Consequently, the recess is not formed in a composite layer, which is made up of a superposition of materials and therefore is potentially sensitive to problems of mechanical strength at the interfaces between the said materials.

Advantageously, the straight line, which is present in any meridian plane and passes through two intersection points respectively of each recess wall with the axially outer sidewall face, forms an angle at most equal to 25°, preferably at most equal to 15°, with the radial direction.

When the angle A is greater than 25°, the axially outer sidewall face becomes excessively inclined in relation to the radial direction, in the zone of the anchoring means, generally close to the tire bead. Consequently, the lateral walls of the recess do not make it possible to retain the sidewall insert, which will deform under the action of centrifugal forces.

Preferably, the protuberance has, in any meridian plane, a height Hp at least equal to the depth Pc of the recess less 2 mm.

A minimum height value Hp that is equal to the depth Pc of the recess less 2 mm makes it possible to position a sidewall insert over the protuberance, with a sufficient anchoring height whilst still not protruding beyond, or protruding only very little beyond, the axially outer sidewall face. This configuration thus ensures effective anchoring of the sidewall insert whilst still protecting it from potential scuffing of the sidewall against the kerb. Moreover, limited engagement of the sidewall insert in the thickness of the sidewall ensures it can be seen as design means.

Also preferably, the protuberance has, in any meridian plane, a height Hp at least equal to the depth Pc of the recess plus 2 mm.

A maximum height value Hp that is equal to the depth Pc of the recess plus 2 mm makes it possible to avoid the insert being raised in relation to the axially outer sidewall face. This configuration thus makes it possible to not disrupt the flow of air in the vicinity of the sidewall in this zone. Consequently, the aerodynamic drag of the tire is not increased. Correspondingly, the rolling resistance of the tire, and therefore the fuel consumption, are not increased. Moreover, sensitivity to potential scuffing of the sidewall against the kerb remains limited.

With the sidewall comprising, on its axially outer sidewall face and in the radially outer vicinity of a bead, a protective ridge having an edge corner, and the anchoring means having a circumferential mean line, the circumferential mean line of the anchoring means is advantageously positioned, in any meridian plane, at a radial distance d1 at least equal to 4 mm, radially on the outside of the edge corner of the protective ridge.

A protective ridge is positioned on the axially outer sidewall face and in the radially outer vicinity of a bead. A positioning in the radially outer vicinity of the bead means that the radially innermost point of the protective ridge is positioned at a radial distance of at least 4 mm radially on the outside of a rim flange on which the tire is intended to be mounted. Furthermore, the edge corner of the protective ridge is the vertex of the substantially triangular section of the protective ridge, which is not located on the axially outer sidewall face.

Since the function of the protective ridge is to protect the flange of the rim on which the tire is intended to be mounted, it is the portion of the tire that is most liable to rub against external elements, such as kerbs and stones, and also the one that is most liable to come into contact with the ground when the tire is being dismounted. Consequently, the sidewall insert, and therefore the corresponding anchoring means, must be far enough away from the protective ridge to not be damaged. Furthermore, an anchoring means close to the protective ridge makes it even more visible.

Also advantageously, the circumferential mean line of the anchoring means is positioned, in any meridian plane, at a radial distance d2 at least equal to 10% of the nominal section height H of the tire, radially on the inside of an axial straight line passing through the halfway point H/2 of the nominal section height of the tire.

If, for certain tires having a small nominal section height H, and therefore a small sidewall height, the protective ridge is the axially outermost portion of the tire, for other tires the axially outermost point of the tire is positioned on an axial straight line passing through the halfway point H/2 of the nominal section height of the tire. For these tires, to avoid degradation of the sidewall insert, in particular when the sidewall scuffs against a kerb, the circumferential mean line of the corresponding anchoring means is advantageously radially positioned at a radial distance d2 at least equal to 10% of the nominal section height H of the tire, radially on the inside of the axial straight line passing through the halfway point H/2 of the nominal section height of the tire. Typically, the radial distance d2 is at least equal to 2 mm and preferably at least equal to 8 mm.

Embodiments of the invention also relate to a sidewall insert intended to be mounted on a tire sidewall.

The sidewall insert is intended to interact with an anchoring means according to any of the embodiments described above, by engaging in the recess of the anchoring means and by clipping over the protuberance of the anchoring means.

With the anchoring means comprising a protuberance having an outer meridian profile, the sidewall insert preferably has an inner meridian profile parallel to the outer meridian profile of the protuberance, such that the inner meridian profile of the sidewall insert has a minimum insert width Limin, at the minimum protuberance width Lpmin, and a maximum insert width Limax, at the maximum protuberance width Lpmax. In other words, the sidewall insert has a mushroom shape which constitutes a female portion in which the male mushroom shape of the protuberance interlocks, this making it possible to ensure good anchoring.

According to a first variant of the preferred embodiment of the sidewall insert, the difference Lpmax−Limin between the maximum protuberance width Lpmax and the minimum insert width Limin is at least equal to 1.5 mm.

According to a second variant of the preferred embodiment of the sidewall insert, the difference Lpmax−Limin between the maximum protuberance width Lpmax and the minimum insert width Limin is at most equal to 2*E, E being the distance between the straight line passing through the section of minimum insert width Limin and the axially outer bearing face of the insert that bears against the protuberance.

Specifically, to enable effective anchoring, that is to say with sufficient locking of the sidewall insert over the protuberance, it is preferable for the difference Lpmax−Limin between the maximum protuberance width Lpmax and the minimum insert width Limin to be comprised in the range of values [1.5 mm; 2*E]. Being below the lower limit runs the risk of the mounting of the insert over the protuberance being difficult. Being above the upper limit runs the risk of the anchoring being less effective.

This interval defines a range of optimum locking between the sidewall insert and the protuberance, both at the maximum section, corresponding to the respective maximum widths Lpmax and Limax, and at the minimum section, corresponding to the respective minimum widths Lpmin and Limin. At the maximum section, the locking is defined by Lpmax−Limax. At the minimum section, the locking is defined by Lpmin−Limin.

The sidewall insert has a circumferential mean line having a mean diameter D2, before the sidewall insert is anchored to the tire, at most equal to a mean diameter D1 of a circumferential mean line of the anchoring means. In these conditions, the sidewall insert is anchored in the anchoring means under prestress, this contributing to effectively holding the sidewall insert in place in the sidewall, with a low risk of being ejected when the tire is running.

According to a particular embodiment, the sidewall insert may have a variable width in the vicinity of the axially outer sidewall face. This involves a variable width of the recess of the anchoring means, and therefore an anchoring means that does not exhibit symmetry of revolution about the axis of rotation of the tire.

According to a preferred embodiment, the sidewall insert comprises at least one polymeric material, such as a rubber material, a silicone or a thermoplastic material, for example a polyurethane.

The one or more materials of which the sidewall insert is made must be deformable enough not to generate excessive stresses at the interface between the sidewall insert and the anchoring means that are liable to induce cracking and fatigue ruptures in the sidewall of the tire. A polymeric material, such as a rubber material, a silicone or a thermoplastic material, for example a polyurethane, this list not being exhaustive, would meet this requirement.

With the sidewall insert being made of a material having a tensile elastic modulus at 10% elongation M2 and being intended to interact with an anchoring means made of a rubber material having a tensile elastic modulus at 10% elongation M1, M2 is advantageously at least equal to 0.4*M1. The sidewall insert must be stiff enough to enable it to be installed on the sidewall.

With the sidewall insert being made of a material having a tensile elastic modulus at 10% elongation M2 and being intended to interact with an anchoring means made of a rubber material having a tensile elastic modulus at 10% elongation M1, M2 is also advantageously at most equal to 5*M1. The sidewall insert must not be too stiff, so as to not generate excessive stresses in the sidewall of the tire that are liable to damage the sidewall when it is subjected to bending stresses, and to reduce the risk of the sidewall insert being ejected by centrifugation when the tire is running.

The sidewall insert preferably has a colouration and/or a texture different from those of the sidewall comprising the anchoring means. Since the objective of the invention is to personalize the design of the tire sidewalls, the sidewall insert preferably has a differentiating colouration and/or a texture in relation to the sidewall.

The preferably coloured sidewall insert may have one or more differentiated colours in relation to the usually black colour of the sidewall. Also preferably, the sidewall insert is monochrome, with the aim of simplifying its manufacture.

According to particular embodiment variants, to further differentiate the sidewall, the sidewall insert is covered with a graphic or a texture, for example of velvet type.

Lastly, the invention relates to an assembly made up of a tire according to any one of the embodiments of the tire that were described above, and at least one sidewall insert according to any one of the embodiments of the sidewall insert that were described above.

BRIEF DESCRIPTION OF THE DRAWINGS

The features of the embodiments of the invention are illustrated by the schematic FIGS. 1 to 5, which are not drawn to scale.

DETAILED DESCRIPTION OF THE DRAWINGS

Figure 1:
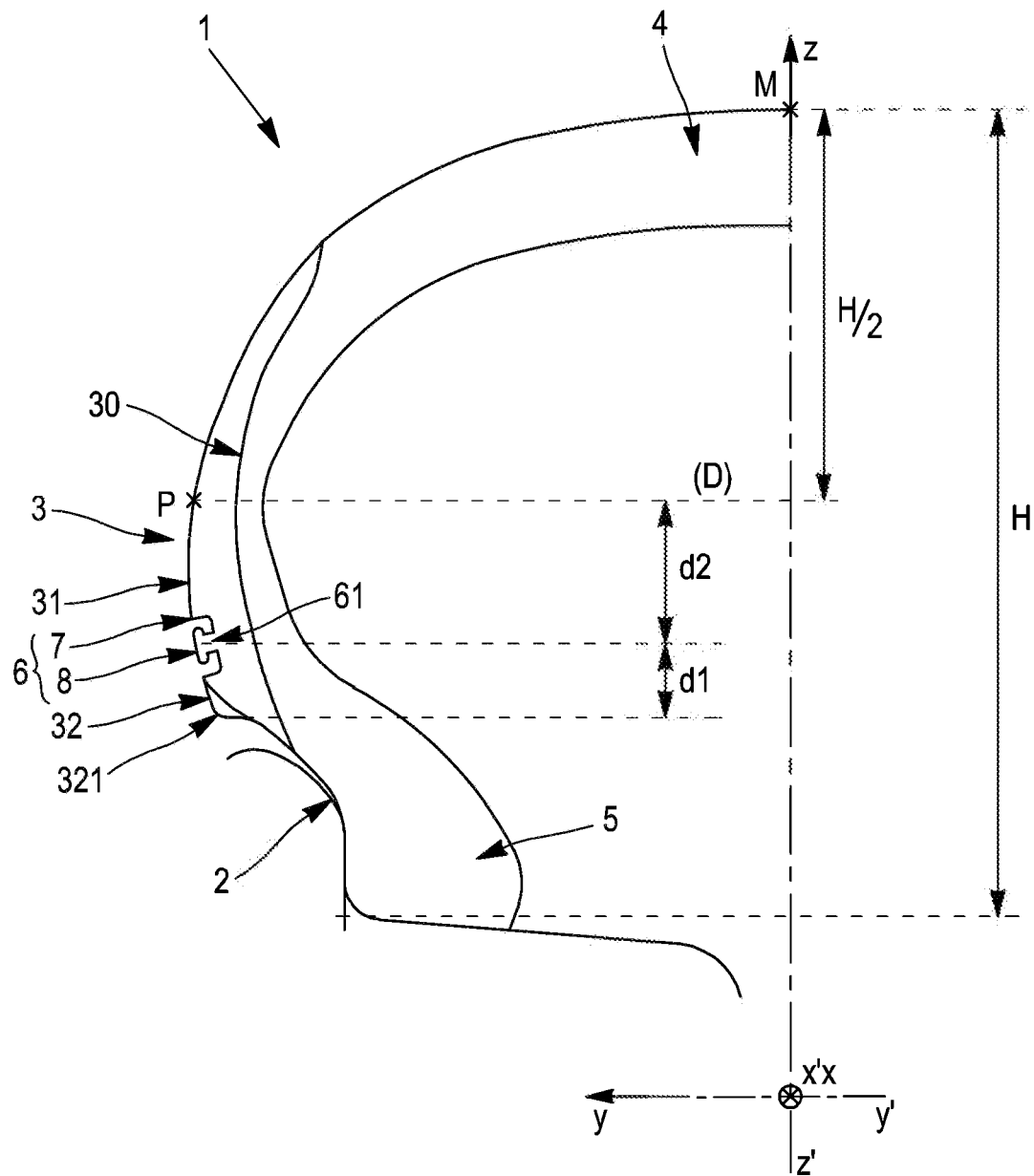
FIG. 1: Meridian half-section through a tire according to the invention, mounted on its rim.

FIG. 1 is a meridian half-section through a tire 1 according to the invention, mounted on its rim 2. The tire 1 for a lightweight vehicle is mounted on a rim 2 and is able to be equipped with at least one sidewall insert 9 (not shown). The tire 1 has a nominal section of height H within the meaning of the ETRTO (European Tire and Rim Technical Organisation) standard and comprises two sidewalls 3 that connect a crown 4 respectively to two beads 5, each of which is intended to come into contact with the rim 2. The sidewall 3 shown comprises an anchoring means 6, intended to interact with a sidewall insert 9 (not shown). The anchoring means 6 extends circumferentially, in a circumferential direction XX' of the tire, and comprises a recess 7 formed in an axially outer sidewall layer 30 comprising at least one rubber material and extending from an axially outer sidewall face 31 axially towards the inside of the sidewall 3. According to the invention, the anchoring means 6 comprises a protuberance 8, which is raised in relation to the recess bottom and extends from the recess bottom to the vicinity of the axially outer sidewall face 31, and the protuberance 8 is constituted, in any meridian plane YZ, by a stepped arrangement of a first narrow portion, extending axially towards the outside from the recess bottom and having a minimum width equal to the minimum protuberance width Lpmin (not referenced), and a second wide portion, extending axially towards the outside from the first narrow portion and having a maximum width equal to the maximum protuberance width Lpmax. In the particular embodiment shown in FIG. 1, on its axially outer sidewall face 31 and in the radially outer vicinity of the bead 5, the sidewall 3 comprises a protective ridge 32 having an edge corner 321. The edge corner 321 of the protective ridge 32 is the vertex of the substantially triangular section of the protective ridge, which is not located on the axially outer sidewall face 31. With the anchoring means 6 having a circumferential mean line 61, the circumferential mean line 61 of the anchoring means 6 is positioned, in the meridian plane YZ, at a radial distance d1 at least equal to 4 mm, radially on the outside of the edge corner 321 of the protective ridge 32. Moreover, the circumferential mean line 61 of the anchoring means 6 is positioned, in the meridian plane YZ, at a radial distance d2 at least equal to 10% of the nominal section height H of the tire 1, radially on the inside of an axial straight line D passing through the halfway point H/2 of the nominal section height of the tire 1.

Figure 2:
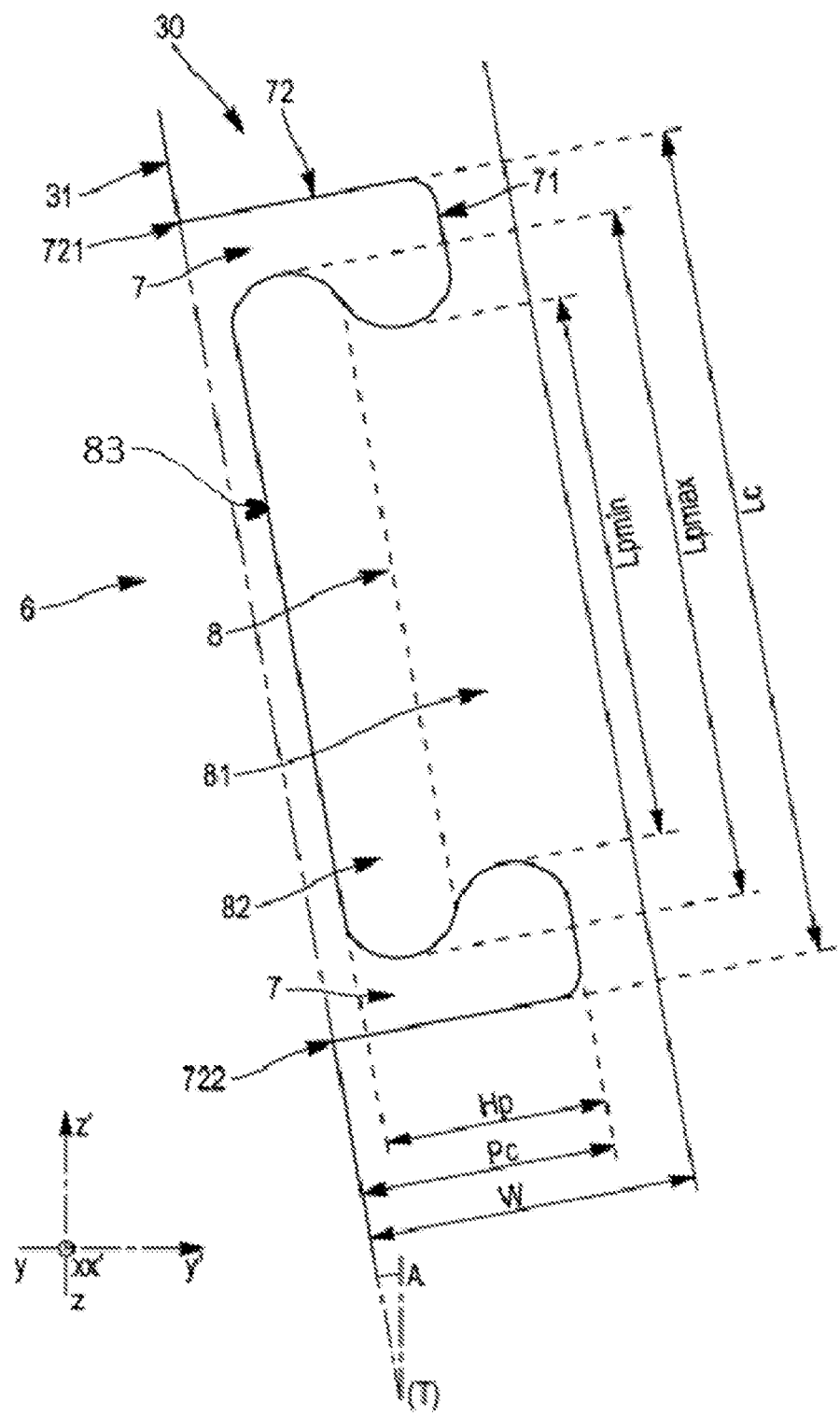
FIG. 2: Meridian section through an anchoring means according to the invention.

FIG. 2 is a meridian section through an anchoring means 6 according to the invention. This is a detailed view of FIG. 1. The anchoring means 6 comprises a recess 7 and a protuberance 8. The recess 7 is delimited axially towards the inside by a recess bottom 71 and radially by two recess walls 72. The recess 7 has, in the meridian plane YZ containing the axis of rotation YY' of the tire, a depth Pc, the maximum distance measured perpendicularly between the axially outer sidewall face 31 and the recess bottom 71, and a width Lc measured, at the axially outer sidewall face 31, between the two recess walls 72. The depth Pc of the recess 7 is at least equal to 2 mm and at most equal to 7 mm. The width Lc of the recess 7 is at most equal to 15%, preferably at most equal to 10% of the nominal section height H of the tire 1. With the axially outer sidewall layer 30 having a thickness W at the anchoring means 6, the difference between the thickness W of the axially outer sidewall layer 30 and the depth Pc of the recess 7 is at least equal to 1 mm. Moreover, the straight line T, which is present in the meridian plane YZ and passes through two intersection points 721, 722 respectively of each recess wall 72 with the axially outer sidewall face 31, forms an angle A at most equal to 25° with the radial direction ZZ'. Lastly, the protuberance 8 is constituted, in any meridian plane YZ, by a stepped arrangement of a first narrow portion 81, extending axially towards the outside from the recess bottom 71 and having a minimum width equal to the minimum protuberance width Lpmin, and a second wide portion 82, extending axially towards the outside from the first narrow portion 81 to an axially outer protuberance face 83 of the wide portion 82 and having a maximum width equal to the maximum protuberance width Lpmax.

Figure 3:
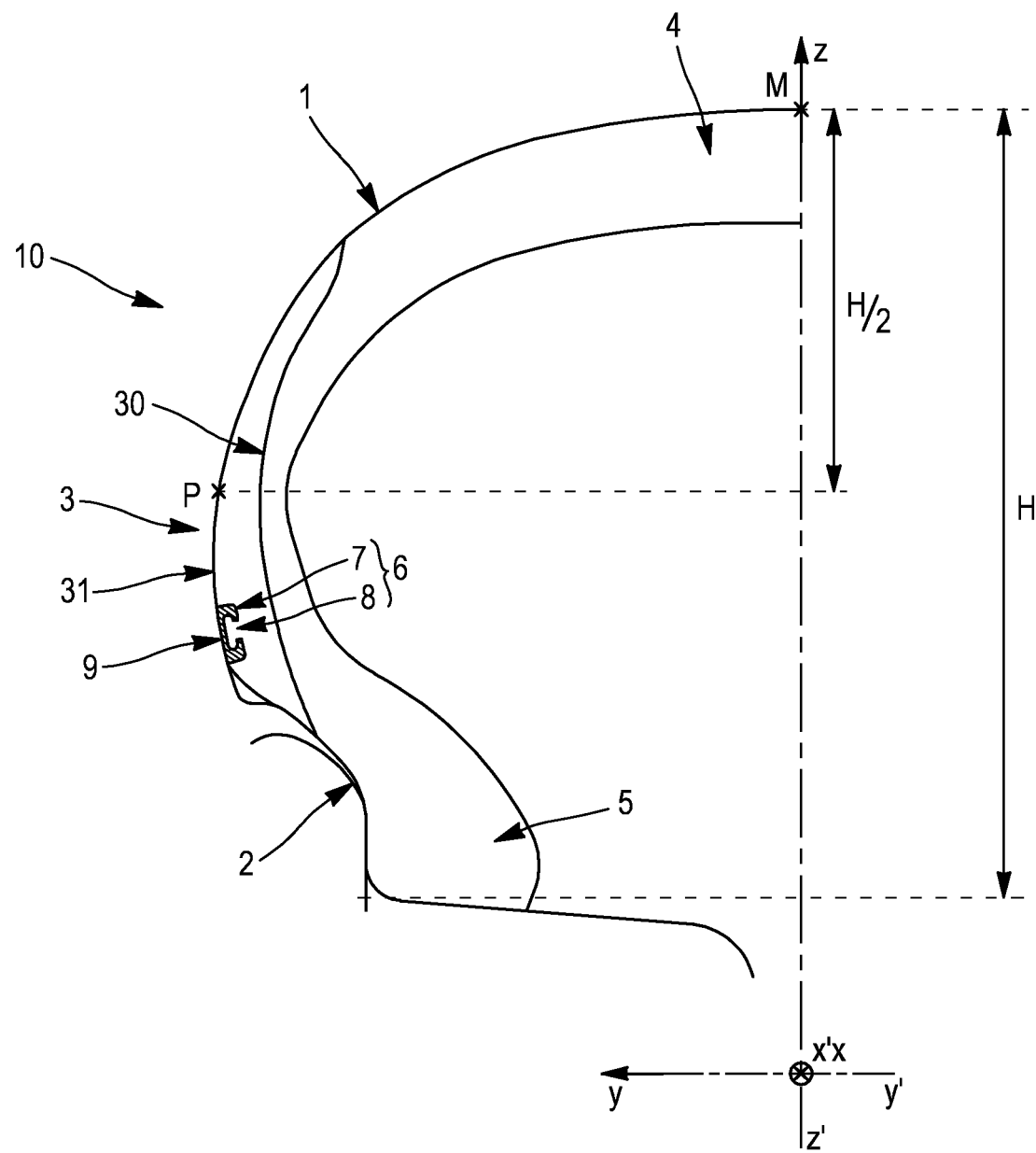
FIG. 3: Meridian half-section through a tire according to the invention, mounted on its rim and equipped with a sidewall insert.

FIG. 3 is a meridian half-section through a tire according to the invention, mounted on its rim and equipped with a sidewall insert. It combines the tire of FIG. 1 with a sidewall insert 9.

Figure 4:
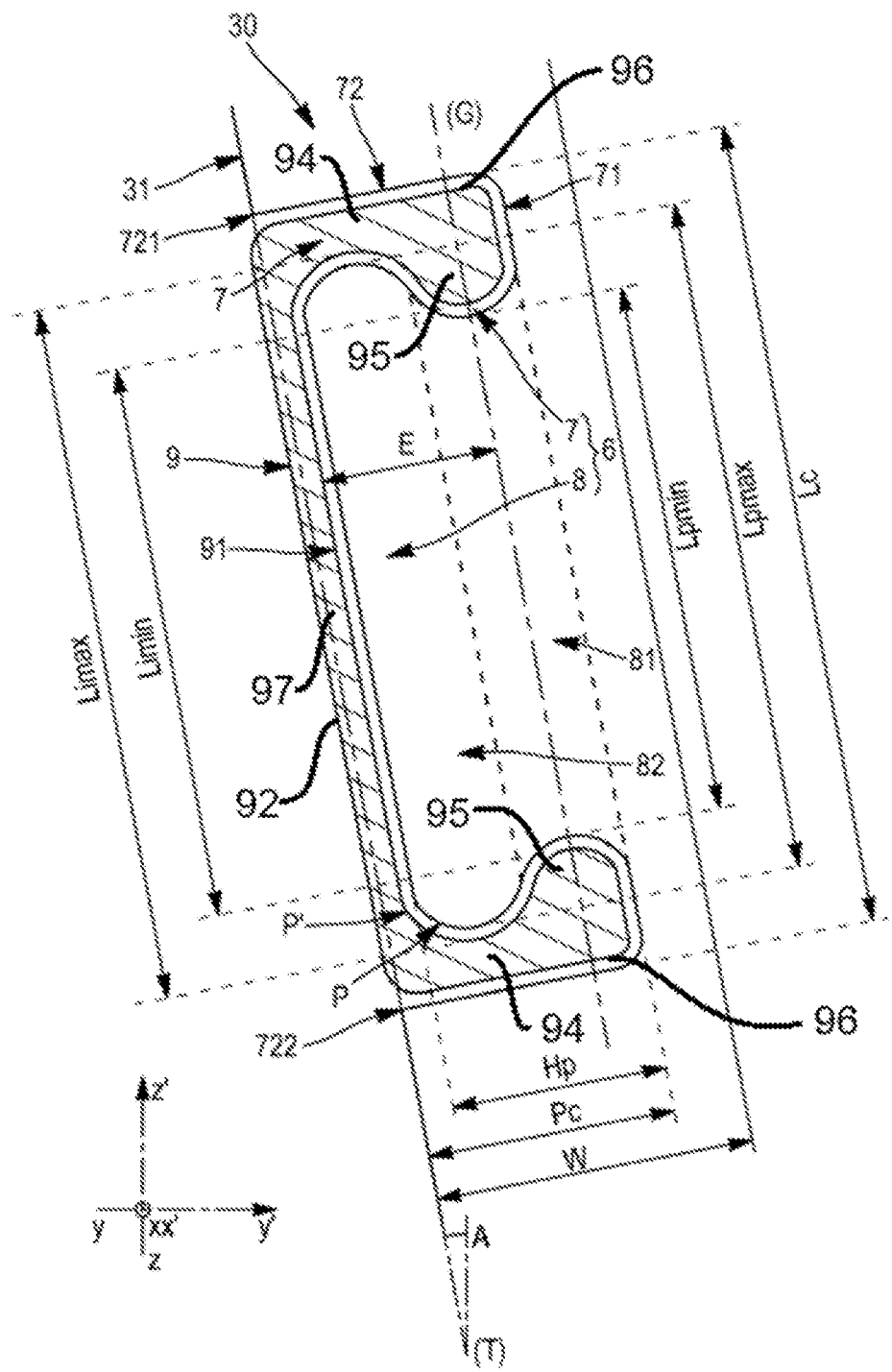
FIG. 4: Meridian section through an anchoring means according to the invention, in combination with a sidewall insert.

FIG. 4 is a meridian section through an anchoring means 6 according to the invention, as shown in FIG. 2, in combination with a sidewall insert 9. This is a detailed view of FIG. 4. The anchoring means 6, comprising a protuberance 8, has an outer meridian profile P. The sidewall insert 9 is a single piece that is concurrently engaged in the recess and clipped over the protuberance 8. The single piece sidewall insert 9 comprises a front wall 97 comprising an axially outer insert face 92, which is decorative, and an axially inner insert face 91, which is applied in contact with the axially outer protuberance face 83, and two rear members 94, which each protrude from the axially inner insert face 91 integrally with the front wall 97, and which each comprise a protrusion 95 and an edge 96, the two protrusions 95 facing each other and receiving directly therebetween the narrow portion 81 to clip the single piece to the protuberance 8, and the two edges 96 facing away from each other and being locked between the two recess walls 72 to hold the single piece in place. The sidewall insert 9 has an inner meridian profile P' parallel to the outer meridian profile P of the protuberance 8. The inner meridian profile P' of the sidewall insert 9 has a minimum insert width Limin, at the minimum protuberance width Lpmin, and a maximum insert width Limax, at the maximum protuberance width Lpmax. Moreover, according to the preferred variant shown, the difference Lpmax-Limin between the maximum protuberance width Lpmax and the minimum insert width Limin is at least equal to 1.5 mm and at most equal to 2*E, E being the distance between the straight line G passing through the section of minimum insert width Limin and the axially outer bearing face 91 of the insert 9 that bears against the protuberance 8.

The inventors have more particularly examined this invention for a tire of size 245/45 R 18 100 W XL, which is intended to be inflated to a recommended pressure equal to 2.9 bar and to bear a recommended load equal to 800 kg.

The characteristics of the example examined by the inventors are presented in Table 1 below:

TABLE 1

| Characteristics | Characteristic values | Comments |
|---|---|---|
| Nominal section H of the tire | 110 mm | |
| Radial distance d1 from the anchoring means to the protective ridge | 8.4 mm | At least equal to 4 mm |
| Radial distance d2 from the anchoring means to the halfway point of the nominal section height | 20 mm | At least equal to 10% of H = 11 mm |
| Depth Pc of the recess | 3.9 mm | At least equal to 2 mm and at most equal to 7 mm |
| Width Lc of the recess | 9.1 mm | At most equal to 15% of H = 16.5 mm |

TABLE 1-continued

| Characteristics | Characteristic values | Comments |
|---|---|---|
| Height Hp of the protuberance | 2.9 mm | At least equal to Pc-2 mm = 1.9 mm and at most equal to Pc + 2 mm = 5.9 mm |
| Minimum width Lpmin of the protuberance | 4.4 mm | |
| Maximum width Lpmax of the protuberance | 5.4 mm | Lpmax-Lpmin = 1 mm, thus at least equal to 1 mm and at most equal to 4 mm |
| Thickness W of the axially outer sidewall layer | 7.5 mm | W-Pc = 3.6 mm, thus at least equal to 2 mm |
| Minimum width Limin of the sidewall insert | 3.9 mm | Lpmin-Limin = 0.5 mm (locking in the min. section) |
| Maximum width Limax of the sidewall insert | 5.2 mm | Lpmax-Limax = 0.2 mm (locking in the max. section) |
| Distance E between the straight line G passing through the section of minimum width of the insert and the axially outer bearing face of the insert | 2.25 mm | |
| Difference Lpmax-Limin | 1.5 mm | 1.5 mm <= Lpmax-Limin <= 2*E = 4.5 mm |

The inventors were able to note facilitated mounting and more effective attachment for a sidewall insert with which a sidewall of the tire according to the invention is equipped.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An assembly comprising:
   a tire for a lightweight vehicle, and
   a sidewall insert,
   wherein the tire has a nominal section of height H and comprises:
   two sidewalls that connect a crown of the tire respectively to two beads of the tire, each of which is intended to come into contact with a rim on which the tire is intended to be mounted,
   wherein at least one of the two sidewalls comprises:
   an axially outer sidewall face that is in contact with atmospheric air,
   an axially outer sidewall layer, which extends radially from the crown to the corresponding bead and axially inward from the axially outer sidewall face, and which comprises at least one rubber material, and
   an anchoring means, which interacts with the sidewall insert to anchor the sidewall insert and which extends circumferentially in a circumferential direction of the tire,
   wherein the anchoring means comprises:
   a recess that is formed in the axially outer sidewall layer, recessing from a portion of the axially outer sidewall face, which extends radially on both sides of the recess,
   the recess being delimited axially inward by a recess bottom and radially by two recess walls that each extend from the recess bottom to said portion of the axially outer sidewall face, and a protuberance, which is raised relative to the recess bottom and which extends from the recess bottom to an axially outer protuberance face of the protuberance, which is located at a vicinity of said portion of the axially outer sidewall face, wherein the recess has, in any meridian plane containing an axis of rotation of the tire:
- a depth Pc, which is a maximum distance measured perpendicularly between said portion of the axially outer sidewall face and the recess bottom, and which is at least equal to 2 mm, and
- a width Lc, which is measured, at said portion of the axially outer sidewall face, between the two recess walls and which is at most equal to 15% of the nominal section height H of the tire, wherein the protuberance comprises, in any meridian plane:
- a narrow portion, extending outward from the recess bottom and having a minimum width equal to a minimum width Lpmin of the protuberance, and
- a wide portion, extending axially outward from the narrow portion and having a maximum width equal to a maximum width Lpmax of the protuberance, the wide portion bearing the axially outer protuberance face and being stepped relative to the narrow portion, wherein a difference between the maximum width Lpmax and the minimum width Lpmin is at least equal to 1 mm and at most equal to 4 mm, wherein the sidewall insert is a single piece that is concurrently engaged in the recess and clipped over the protuberance, the single piece comprising:
- a front wall comprising an axially outer insert face, which is decorative, and an axially inner insert face, which is applied in contact with the axially outer protuberance face, and
- two rear members, which each protrude from the axially inner insert face integrally with the front wall, and which each comprise a protrusion and an edge, the two protrusions facing each other and receiving directly therebetween the narrow portion to clip the single piece to the protuberance, and the two edges facing away from each other and being locked between the two recess walls to hold the single piece in place, and wherein the recess is shaped into a thickness of the axially outer sidewall layer and the single piece of the sidewall insert is engaged in said thickness of the axially outer sidewall layer, so that the axially outer insert face of the front wall is flush with said portion of the axially outer sidewall face radially on both sides of the recess.

2. The assembly according to claim 1, wherein the depth Pc of the recess is at least equal to 3 mm.

3. The assembly according to claim 1, wherein the depth Pc of the recess is at most equal to 7 mm.

4. The assembly according to claim 1,
wherein the axially outer sidewall layer extends axially from the axially outer sidewall face to an axially outermost reinforcing layer that includes reinforcers,
wherein the axially outer sidewall layer has a thickness W that is measured at the anchoring means between said portion of the axially outer sidewall face and the reinforcers of the axially outermost reinforcing layer, and
wherein a difference between the thickness W of the axially outer sidewall layer and the depth Pc of the recess is at least equal to 1 mm.

5. The assembly according to claim 1, wherein the width Lc of the recess is at most equal to 10% of the nominal section height H of the tire.

6. The assembly according to claim 1, wherein the width Lc of the recess is at most equal to 20 mm.

7. The assembly according to claim 1, wherein the axially outer sidewall layer is made up of a single rubber material.

8. The assembly according to claim 1, wherein a straight line (T), which is present in any meridian plane and passes through two intersection points respectively of each of the two recess walls with said portion of the axially outer sidewall face, forms an angle at most equal to 25° with a radial direction.

9. The assembly according to claim 1, wherein the protuberance has, in any meridian plane, a height Hp, which is a maximum distance measured perpendicularly between the axially outer protuberance face and the recess bottom and which is at least equal to the depth Pc of the recess less 2 mm.

10. The assembly according to claim 1, wherein the protuberance has, in any meridian plane, a height Hp, which is a maximum distance measured perpendicularly between the axially outer protuberance face and the recess bottom and which is at most equal to the depth Pc of the recess plus 2 mm.

11. The assembly according to claim 1, wherein the single piece of the sidewall insert has a circumferential mean line having a mean diameter D2, before the sidewall insert is mounted on the tire, at most equal to a mean diameter D1 of a circumferential mean line of the anchoring means.

12. The assembly according to claim 1, wherein the single piece of the sidewall insert comprises at least one polymeric material.

13. The assembly according to claim 1,
wherein the single piece of the sidewall insert is made of a material having a tensile elastic modulus at 10% elongation M2,
wherein the anchoring means is made of a rubber material having a tensile elastic modulus at 10% elongation M1, and
wherein M2 is at least equal to 0.4*M1.

14. The assembly according to claim 1,
wherein the single piece of the sidewall insert is made of a material having a tensile elastic modulus at 10% elongation M2,
wherein the anchoring means is made of a rubber material having a tensile elastic modulus at 10% elongation M1, and
wherein M2 is at most equal to 5*M1.

15. The assembly according to claim 1, wherein the single piece of the sidewall insert has a colouration and/or a texture different from those of the at least one of the two sidewalls.

16. The assembly according to claim 1, wherein said portion of the axially outer sidewall face is flush with the rest of the axially outer sidewall face, which extends radially from said portion of the axially outer sidewall face to the crown and from said portion of the axially outer sidewall face to the corresponding bead.

17. The assembly according to claim 1, wherein the protuberance, the two recess walls and the single piece of the sidewall insert have each an elongated shape that extends in length in the circumferential direction of the tire.

18. The assembly according to claim 1, wherein the protuberance has a mushroom shape having a mushroom stem formed by the narrow portion and a mushroom cap formed by the wide portion.

19. The assembly according to claim 1, wherein each of the two recess walls is planar, and wherein the two edges are each planar and face respectively the two planar recess walls.

20. The assembly according to claim 1, wherein the at least one of the two sidewalls further comprises a protective ridge, which protrudes from the axially outer sidewall face and which is located in the radially outer vicinity of the corresponding bead.

21. The assembly according to claim 20, wherein the anchoring means has a circumferential mean line that is positioned, in any meridian plane, at a radial distance d1 at least equal to 4 mm, radially outward from an edge corner of the protective ridge.

22. The assembly according to claim 21, wherein the circumferential mean line of the anchoring means is positioned, in any meridian plane, at a radial distance d2 at least equal to 10% of the nominal section height H of the tire, radially inward from an axial straight line passing through a halfway point H/2 of the nominal section height H of the tire.

23. The assembly according to claim 1, wherein the protuberance has an outer meridian profile, wherein the sidewall insert has an inner meridian profile parallel to the outer meridian profile of the protuberance, and wherein the inner meridian profile of the sidewall insert has a minimum width Limin, at the minimum width Lpmin of the protuberance, and a maximum insert width Limax, at the maximum width Lpmax of the protuberance.

24. The assembly according to claim 23, wherein a difference between the maximum width Lpmax of the protuberance and the minimum width Limin of the sidewall insert is at least equal to 1.5 mm.

25. The assembly according to claim 23, wherein a difference between the maximum width Lpmax of the protuberance and the minimum width Limin of the sidewall insert is at most equal to 2*E, E being a distance between a straight line passing through a section having the minimum width Limin of the sidewall insert and the axially inner insert face of the front wall.

* * * * *